US006847823B2

United States Patent
Lehikoinen et al.

(10) Patent No.: US 6,847,823 B2
(45) Date of Patent: Jan. 25, 2005

(54) SYSTEM AND METHOD FOR ACCESSING LOCAL SERVICES WITH A MOBILE TERMINAL

(75) Inventors: Juha Lehikoinen, Lakiala (FI); Riku Suomela, Tampere (FI)

(73) Assignee: Nokia Corporation, Espoo (FI)

( * ) Notice: Subject to any disclaimer, the term of this patent is extended or adjusted under 35 U.S.C. 154(b) by 608 days.

(21) Appl. No.: 09/742,844

(22) Filed: Dec. 20, 2000

(65) Prior Publication Data

US 2002/0077060 A1 Jun. 20, 2002

(51) Int. Cl.[7] .................................................. H04Q 7/20
(52) U.S. Cl. .............................. 455/456.1; 455/556.3; 705/14
(58) Field of Search .......................... 455/456.1, 556.3; 705/14

(56) References Cited

U.S. PATENT DOCUMENTS 5,963,861 A * 10/1999 Hanson ................... 455/456.1
6,122,530 A * 9/2000 Overy et al. ................ 455/566
6,208,866 B1 * 3/2001 Rouhollahzadeh et al. ...... 455/456.5
6,327,535 B1 * 12/2001 Evans et al. ................ 701/300
6,452,498 B2 * 9/2002 Stewart .................... 340/573.1
6,505,046 B1 * 1/2003 Baker ..................... 455/456.3

* cited by examiner

Primary Examiner—Lee Nguyen
Assistant Examiner—Minh D. Dao
(74) Attorney, Agent, or Firm—Cohen, Pontani, Lieberman & Pavane

(57) ABSTRACT

In a mobile communication system, a method and system for obtaining location-dependent services information by using a mobile station. An information beacon containing services information pertaining to the location of the beacon is disposed in an environment. The beacon is capable of communicating with the mobile station when the mobile station is located within the operating range of the beacon. The mobile station includes a services access key which, when selected while the mobile station is within the operating range of the beacon, will transmit a query to the beacon requesting location-based services. In response to the query, location-based services information will be transmitted to the mobile station.

35 Claims, 9 Drawing Sheets

Fig.3 Beacon device

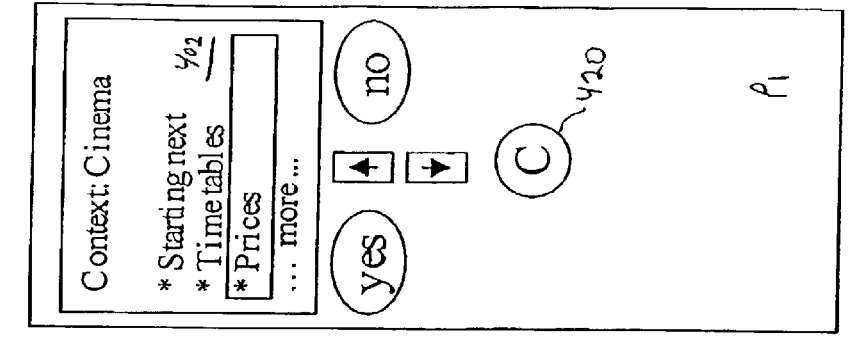
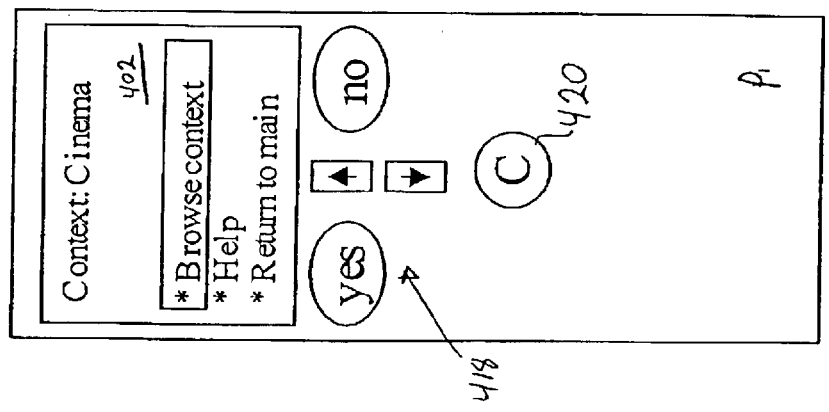
Browse context
User selects browse context And can now browse the downloaded data. This example shows the data as a list.
FIG. 6B

SYSTEM AND METHOD FOR ACCESSING LOCAL SERVICES WITH A MOBILE TERMINAL

BACKGROUND OF THE INVENTION

1. Field of the Invention

The present invention relates to a mobile communication network and, more particularly, to accessing local services pertaining to a geographic location of a mobile station.

2. Description of the Related Art

Various service announcements can be transmitted to mobile stations on the basis of a service request of a subscriber in mobile communication systems. Generally, these services are most often arranged to be provided from outside the actual mobile communication system. By placing a call to a required service number, a mobile subscriber is able to order a selected service announcement to be delivered to the display of the mobile station, for example. These individual services may include weather forecast, traffic announcements, local news and other local services, such as taxi information, automobile service station announcements, mass transportation announcements and schedule information and various other commercial service announcements where the mobile subscriber seeks the desired announcement on the basis of the subscriber's current geographical location. The mobile subscriber generally desires to have the service announcement related to the subscriber's current location which varies due to the mobile nature of the mobile subscriber.

FIG. 1 shows a simplified block diagram of the pan-European GSM mobile communication system. It will be understood that this is only an example of a GSM network. The mobile station MS is connected via the radio path to one of the base transceiver stations BTS, such as the base station BTS1 in FIG. 1. The base station system BSS comprises a base station controller BSC and base stations BTS controlled by the BSC. Usually several base station controllers are controlled by a mobile services switching center MSC. The mobile services switching center is connected to other mobile services switching centers.

The GSM is connected to other networks through a gateway mobile services switching center GMSC, such as the public switched telephone network PSTN, to a public land mobile network PLMN, to an integrated services data network ISDN or to a service center SC, such as the short message service center SMSC. The operation and maintenance center OMC monitors the operation of the entire system. The subscriber data of the mobile station MS is stored permanently in a home location register HLR and temporarily in a visitor location register VLR in the area of which the mobile station MS is located at a particular time. The location information of the mobile station MS is stored in the visitor location register VLR. The geographical area monitored by the visitor location register is divided into one or more location areas LA. One or more base stations BTS can operate in each location area.

The base stations BTS continuously broadcast information on a broadcast channel concerning themselves and their environment, such as a base station identity code BSIC, adjacent cell information and a location area identifier LAI broadcast on a paging channel. The cell broadcast center situated at the base station controller BSC, for example, manages the messages of the cell broadcast channels of the base stations BTS. The cell broadcast center transmits via the base station controller BSC the broadcast messages assigned for each individual base station BTS on the basis of initial information supplied by the operator. The broadcast on paging channels and cell broadcast channels, for example, has no address, is not encrypted and is intended to be received by all mobile stations MS within the geographical area covered by the transmission of the base station. The location information can then be used to solicit location based services, as more fully described in PCT Patent Document WO 98/19479.

The availability of various types of wireless communication devices produces a need to have these devices interact with each other in a manner which is cost efficient and which can be easily implemented. Such communication can occur in GSM systems using SMS wherein short messages are communicated directly between two or more terminal devices, such as mobile stations, e.g. telephones, PDAs, etc. Terminal devices can also communicate with each other using infrared signals or radio frequency (RF) signals.

Recently, low power RF systems have been proposed for providing communications between a plurality of transceivers through a short-range radio link having a broadcast range of several meters. One such local RF system is currently under development and is referred to as "Bluetooth". This system will be commercially available in the near future and is designed to operate in the open spectrum, e.g., around 2.4 gigahertz. The Bluetooth system will allow for devices such as mobile phones, computers, and other types of terminal devices which are located within an operable range of the RF system to communicate with each other.

Such local RF communication between various types of wireless devices has been proposed through the use of information beacons. For example, in commonly-owned U.S. patent application Ser. No. 09/612,872, such information beacons are used to store, forward and receive short messages via local wireless communication, such as Bluetooth. The information beacons are essentially wireless transceiver devices capable of communicating within an associated operating range and, in particular, with wireless communication devices or other beacons located within the associated operating range.

There are difficulties in accessing location dependent services from local RF communication systems and from SMS because the short message queries used to solicit such services information must be formulated, e.g. by depressing numerous keys on a mobile station keypad, etc. Moreover, the user will not know, until such a service request is placed, where such desired information is located, i.e. on a local RF server or on an SMS server. Thus, the user may be required to submit multiple inquiries and then select among the received transmissions, to obtain the desired information.

SUMMARY OF THE INVENTION

To overcome limitations in the prior art described above and to overcome other limitations that will become apparent upon reading and understanding the present specification, the present invention discloses a system, apparatus and method for communicating services to a wireless terminal operating within a wireless network. The wireless device is not limited to any preset navigational structure, and provides the ability to remotely access services.

In accordance with one embodiment of the invention, a method of providing location-dependent services information to a mobile station is provided, the mobile station being capable of short range communication. The method includes determining whether the mobile station is within an operating range of a short range communication beacon for effecting wireless communication between the mobile station and the beacon; establishing a communication link between the mobile station and the beacon if it is determined that the mobile station is within the operating range of the beacon; activating a services access key on the mobile station for transmitting a short range wireless communication query to the beacon for requesting location-dependent services information pertaining to a location of the mobile station; and transmitting, from the beacon to the mobile station in response to the mobile station query, location-dependent services information.

In accordance with another embodiment, the mobile station of the method contains a memory and wherein the mobile station is capable of communicating with a base transceiver station, the method further includes broadcasting location information to the mobile station over the base transceiver station broadcast channel; storing the location information in the mobile station memory; sending a request along with the stored memory location from the mobile station to a remote service provider for location-dependent services information concerning services pertaining to the location information if it is determined that the mobile station is not within the operating range of the beacon; and transmitting, from the service provider to the mobile station, location-dependent services information.

According to yet another embodiment of the present invention a system for providing location-dependent services information to a mobile station is described, the mobile station being capable of short range communication, including a mobile station including at least a short range transceiver and a service access key, the mobile station located within an operating range of a short range transceiver of a short range communication beacon; the service access key of the mobile station being selectable for requesting location-dependent services information pertaining to a location of the mobile station, and; the short range transceiver of the mobile station being capable of sending a request for location-dependent services information and receiving a reply from the short range transceiver of the short range communication beacon in response to the request for location-dependent services.

According to yet another embodiment, the inventive system also includes a memory in the mobile station which is capable of communicating with a base transceiver station, the system further including means for broadcasting to the mobile station over the base transceiver station broadcast channel, location information; means for storing the location information in the mobile station memory; means for sending a request along with the stored memory location information from the mobile station to a remote service provider for location-dependent services information concerning services pertaining to the location information; and means for transmitting, from the service provider to the mobile station, location-dependent services information.

According to yet another embodiment, the present invention is directed to a mobile station having an access key for requesting location based services. The mobile station may, according to another embodiment, include a processor; a memory unit; a short range transceiver enabling short range communication; a network transceiver enabling communication in a mobile network; an output device for outputting received content; and software means operative on the processor. The software means operates for maintaining in the memory unit a database including a communication response value and a threshold value and at least one predetermined message requesting for location-dependent services usable for short range communication and at least one another predetermined message requesting for location-dependent services usable for different type of communication; starting short range communication in response to selecting the service access key using the predetermined message requesting for location-dependent services usable for short range communication; periodically scanning the value of the communication response; and if the communication response value exceeds the threshold value, starting communication using the predetermined message requesting for location-dependent services usable for different type of communication.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings:

FIGS. 6A and 6B depict an illustrative usage scenario according to one embodiment of the invention;

DETAILED DESCRIPTION OF THE PRESENTLY PREFERRED EMBODIMENTS

In the following description of the various embodiments, reference is made to the accompanying drawings which form a part hereof, and in which is shown by way of illustration various embodiments in which the invention may be practiced. It is to be understood that other embodiments may be utilized, and structural and functional modifications may be made without departing from the scope of the present invention.

Figure 1:
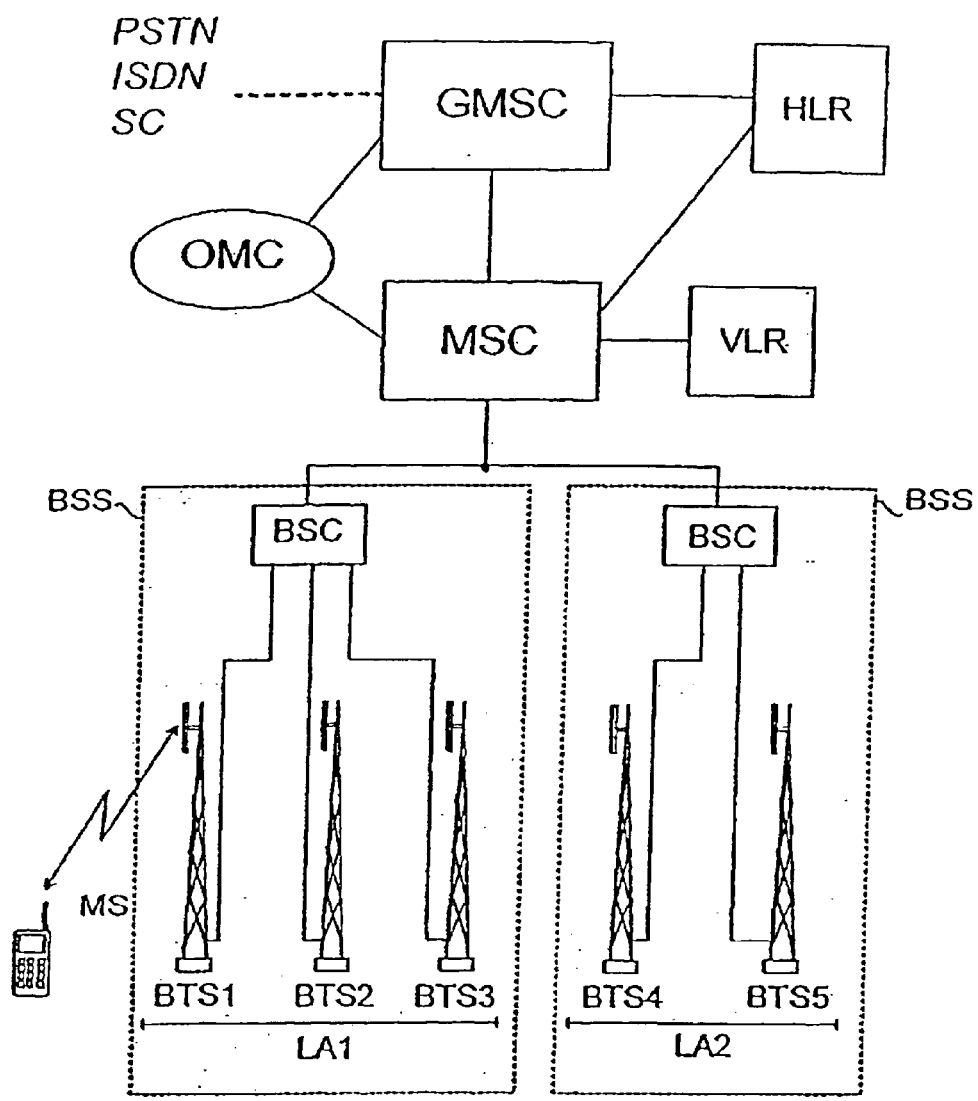
FIG. 1 is a block diagram of a prior art GSM mobile communication system according to one embodiment of the invention.
Figure 2:
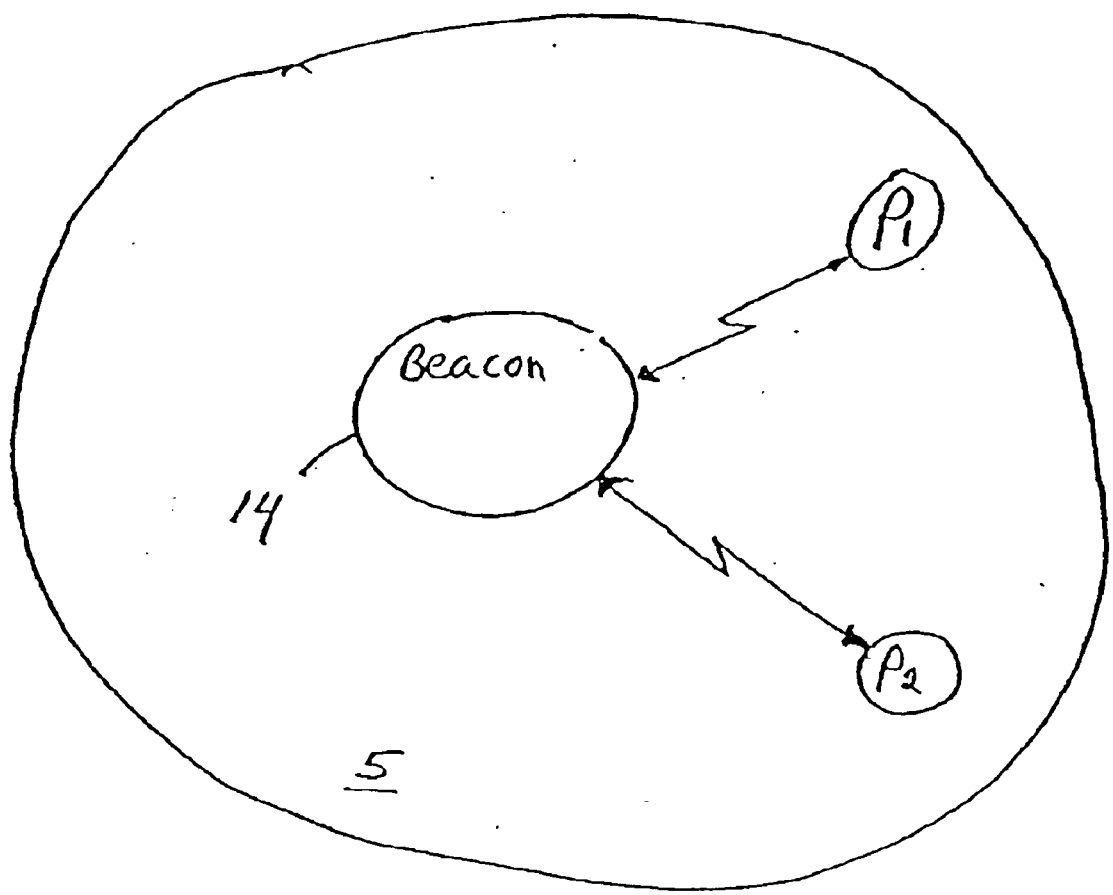
FIG. 2 is a graphical representation of a beacon communication system according to one embodiment of the invention.

FIG. 2 depicts, according to one embodiment of the invention, an information beacon 14 operable in an operating range 5 for communicating with one or more mobile stations or terminal devices, such as PDAs or mobile phones $P_1$, $P_2$ which are located within the operating range 5. The term "beacon" refers herein to a wireless store/forward transceiver relay device, as explained more fully below, for storing messages and transmitting the stored messages to one or more terminal devices. It should be noted that beacon 14 can also serve as a network node or connection point which provides access to and communication with a network, such as a host device, as more fully described in U.S. patent application Ser. No. 09/614,508, filed on Jul. 11, 2000, the entire content of which is hereby incorporated by reference.

The beacon 14 is a relatively small, portable transceiver device which communicates data between itself, neighboring beacons, and mobile stations within the respective beacon operating range. Each beacon 14 includes an RF receiver and transmitter capable of receiving and transmitting data over the operative range of the RF receiver. For example, if Bluetooth technology is employed, the operating range of each beacon and, consequently, the distance between a beacon and a mobile station or an adjacent beacon in a network (i.e. the length of each link) using current technology is in the range of approximately 10 meters for a normal power mode and 300 meters for a high power mode.

Figure 3:
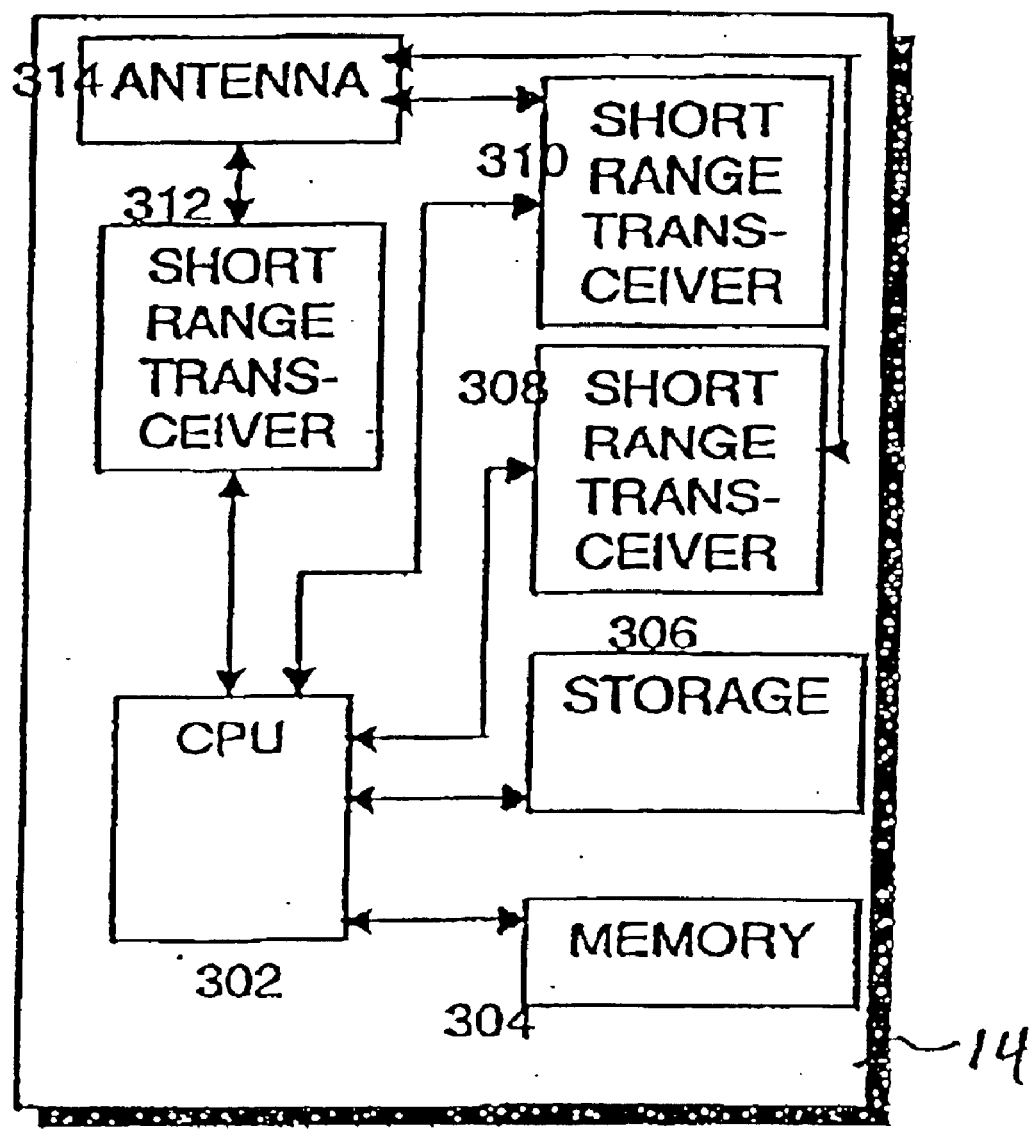
FIG. 3 is a block diagram of a short range low power beacon for use in the communication system of FIG. 1 according to one embodiment of the invention.

A detail of a preferred beacon device 14 according to one embodiment of the invention is illustrated in FIG. 3. The beacon includes a central processing unit (CPU) 302 interfaced with one or more short range (e.g., Bluetooth) transceivers 308, 310, 312 for communicating with other beacons 14 or with a host in a network. If the beacon 14 serves as a host, the beacon will include means (not shown) for communicating with other networks. A memory 304 and storage area 306 are provided for storing application software as well as data to be communicated to intended recipients. Each beacon functions as a transceiver device and is operable in the corresponding region 5 (shown in FIG. 2), typically defined by the radius of its transmission range. Thus, for a 10 meter operating range, each beacon 14 will be able to communicate with devices contained within a relatively circular geographic area defined by the operating range and centered at the location of the beacon 14. Such communication may be between a subject beacon and one or more neighboring beacons or between a subject beacon and one or more mobile stations. The operation of beacons 14 is more fully described in U.S. patent application Ser. No. 09/612,872, the entire content of which is incorporated by reference.

Figure 4:
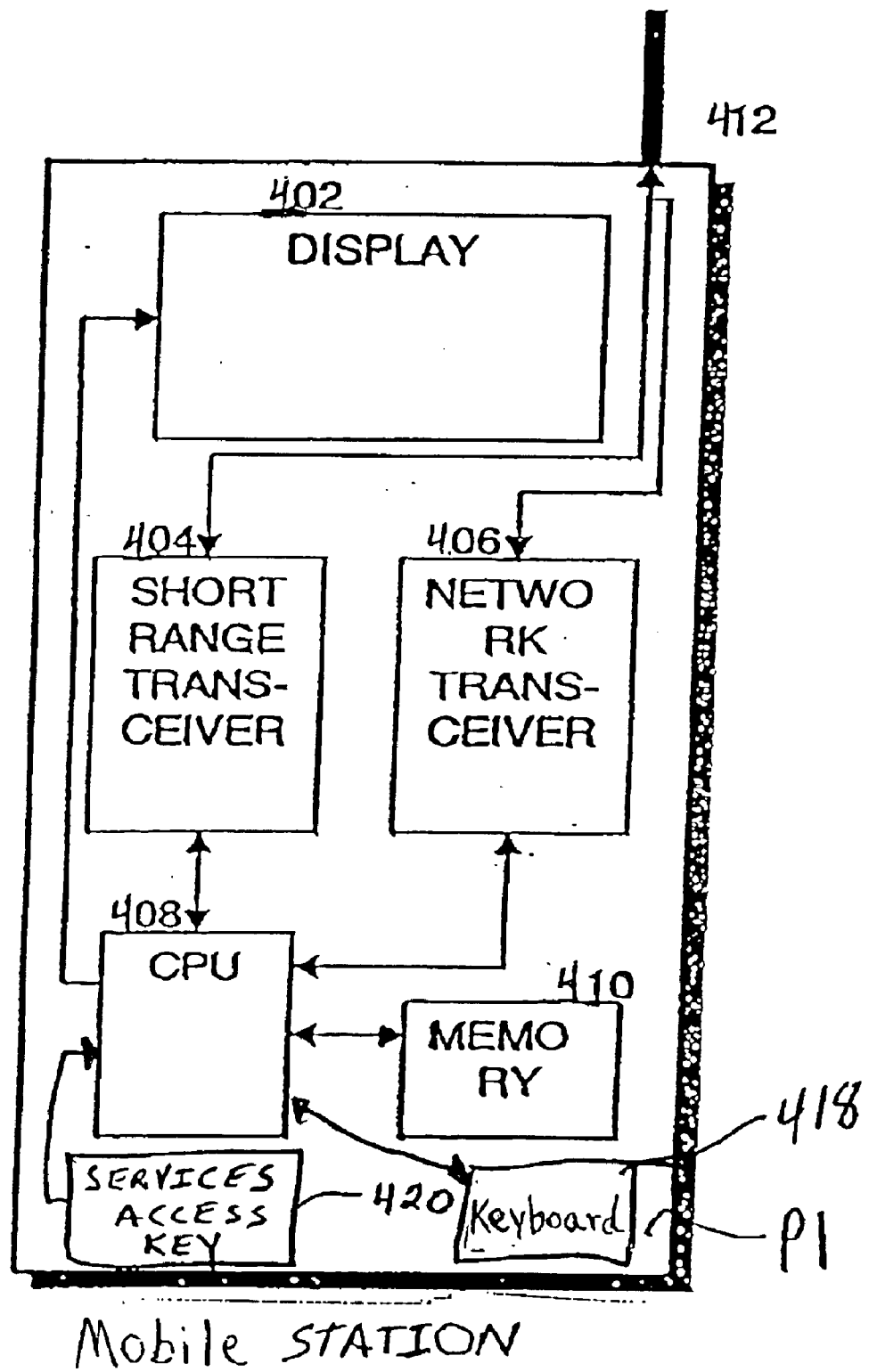
FIG. 4 is a block diagram of a mobile station for use in the communication system according to one embodiment of the invention.

A detail of a preferred mobile station and, particularly, a mobile phone $P_1$ according to one embodiment of the invention is illustrated in FIG. 4. As shown, the mobile phone includes a display 402, such as an LCD display as is known in the art, a central processing unit (CPU) 408 and a memory 410. Standard mobile transmission and reception occurs via a network transceiver 406 connected to an antenna 412, a keypad 418 and short range transmission for communication with a subject beacon 14 in a local RF environment is conducted via a short range transceiver 404 connected to the antenna. The keypad typically contains numerous function keys such as alpha-numeric keys an directional (arrow) keys for scrolling among contents contained in memory or displayed on the display 402. The mobile station also includes one or more services access function keys 420 (also referred to herein as a "context" key) which may be separate from or part of the keypad 418 for transmitting a short range transmission request to a neighboring beacon for soliciting location based information pertaining to the geographic location of the requesting mobile station, as explained more fully below.

To communicate with the beacons 14, the mobile stations include a low power infrared or RF communication feature, such as Bluetooth. It is presently contemplated that communication between a mobile device and a particular beacon will be limited to relatively short text messages in a manner analogous to the Short Message Service available in present GSM systems, but may also include audio messages and larger text messages. To forward a message from a particular beacon to a mobile station, the mobile station (MS) must be capable of communicating with the particular beacon. This is accomplished by activating a low power RF communication feature of the mobile station $P_1$ (e.g. a Bluetooth chip). In the preferred embodiment, this is accomplished by selecting the services access key 420 on the MS when the MS is positioned within the operating range of the beacon. This will automatically transmit an information request to the receiving beacon for requesting location-based services information. Thus, by simply selecting the services access key, a service request query will be transmitted to a beacon located within the reception range of the query. As the request for services information is made via the low power short range RF communication feature (Bluetooth) of the MS, by definition, the general geographic location of the requesting MS is known. In other words, the location of the requesting MS is within the operating range of the receiving beacon. In response to the query, the beacon will wirelessly transmit short range messages in response to the service request query.

Figure 5:
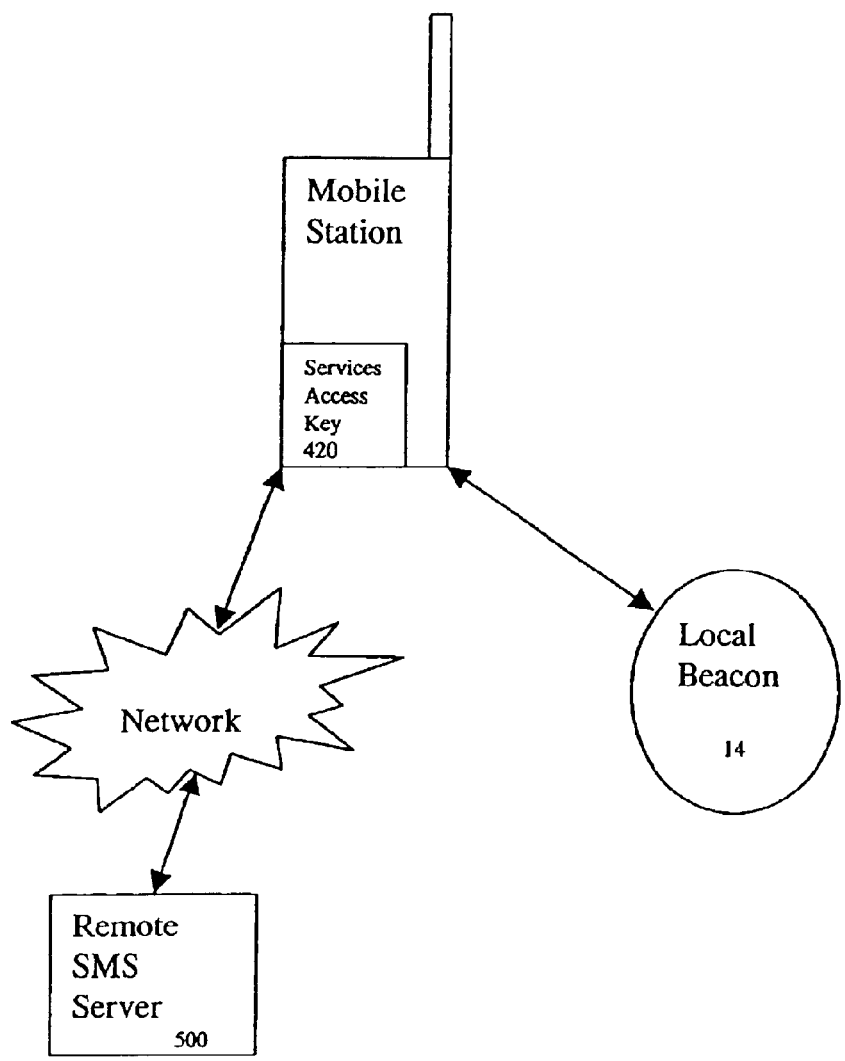
FIG. 5 is a graphical representation of a local service access system in accordance with one embodiment of the invention.

As an example, one or more beacons disposed in a train station may receive continuous updates on train schedule information such as arrivals, departures and track changes. A traveler entering the train station (and the operating ranges of the train station beacons), will be able to obtain the stored train schedule information by simply selecting the services access key 420 on the user's mobile station. This will cause a service request to be wirelessly communicated to a beacon disposed in relative close proximity to the mobile station, whereupon available location-based information will be transmitted to the requesting mobile station for conveyance to the user, e.g., as a text or audio message, etc. This is graphically shown in FIG. 5 embodying the invention.

Figure 6A:
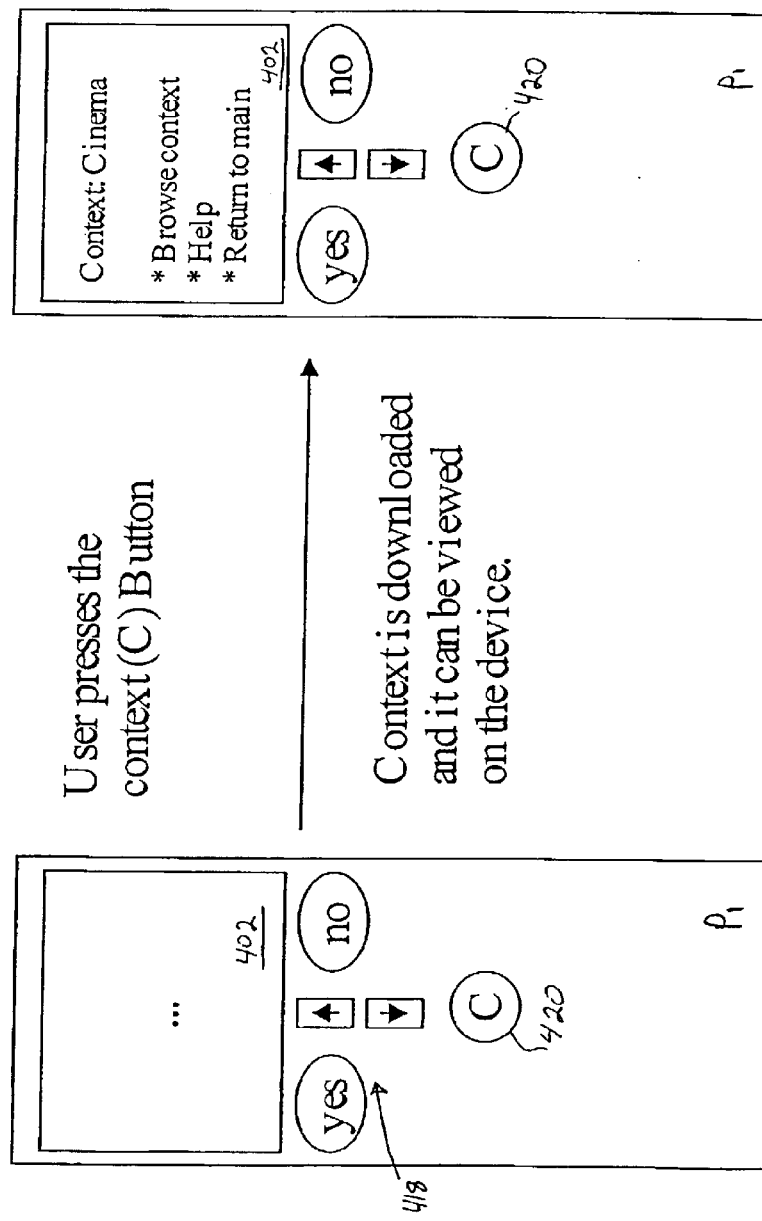

In certain instances location based information may be stored in beacons by category or topic to facilitate transmission to the requesting mobile station. In the train station example discussed above, for example, information may be categorized as schedule information, traffic information (e.g., traffic in locations proximate the train station) and weather information (e.g. weather conditions surrounding the train station). When a local services query is submitted by a requesting MS to a beacon, the beacon will transmit the categories of information available (e.g. schedule, traffic, weather) whereupon the user will select, using functionality on the MS, the category of desired information. The selected information will then be wirelessly transmitted (e.g., by Bluetooth transmission) to the mobile station for review by the mobile station user. As a further illustrative example, and with reference to FIGS. 6A and 6B embodying the invention, the inventive system may be used to obtain information pertaining to a cinema by entering an operating range of a cinema beacon and requesting information stored on the cinema beacon by depressing or selecting the context key 420 on a user's phone $P_1$. The stored content is then transmitted to the phone such as by Bluetooth technology and the user can then use the phone keypad (e.g., the scroll up and down keys, etc.) to browse a category of the downloaded information. In this manner movie schedules, selection, prices, playing duration, etc. may be readily obtained.

In the event the mobile station desires location-based services other than the services provided by the information beacon, or in the event such information is unavailable from the beacon, location-based services can also be requested using known mobile phone communication techniques, such as short messaging, by communicating with a remote server 500 (FIG. 5) such as an SMS server via a short range message communication as is known in the art. For example, after the mobile station has attempted, for a period of time (e.g., 20 seconds, etc.) to access a beacon via Bluetooth transmission, an attempt to contact the remote server will occur automatically. To provide location based services that are relevant to the geographic location of the mobile station user, however, the position of the user must be known to the remote server. This may be accomplished through known GPS location identification techniques or, in the case of SMS, by including the base station identity code (BSIC) of the base station currently in contact with the mobile station and attaching the code with the location based services short message request. This latter technique is more fully described in U.S. patent application Ser. No. 09/101,041, the entire content of which is incorporated by reference. For privacy and security reasons, access to the BSIC codes and/or the GPS location information should be restricted so that the general location of particular mobile stations will not be divulged.

Figure 7:
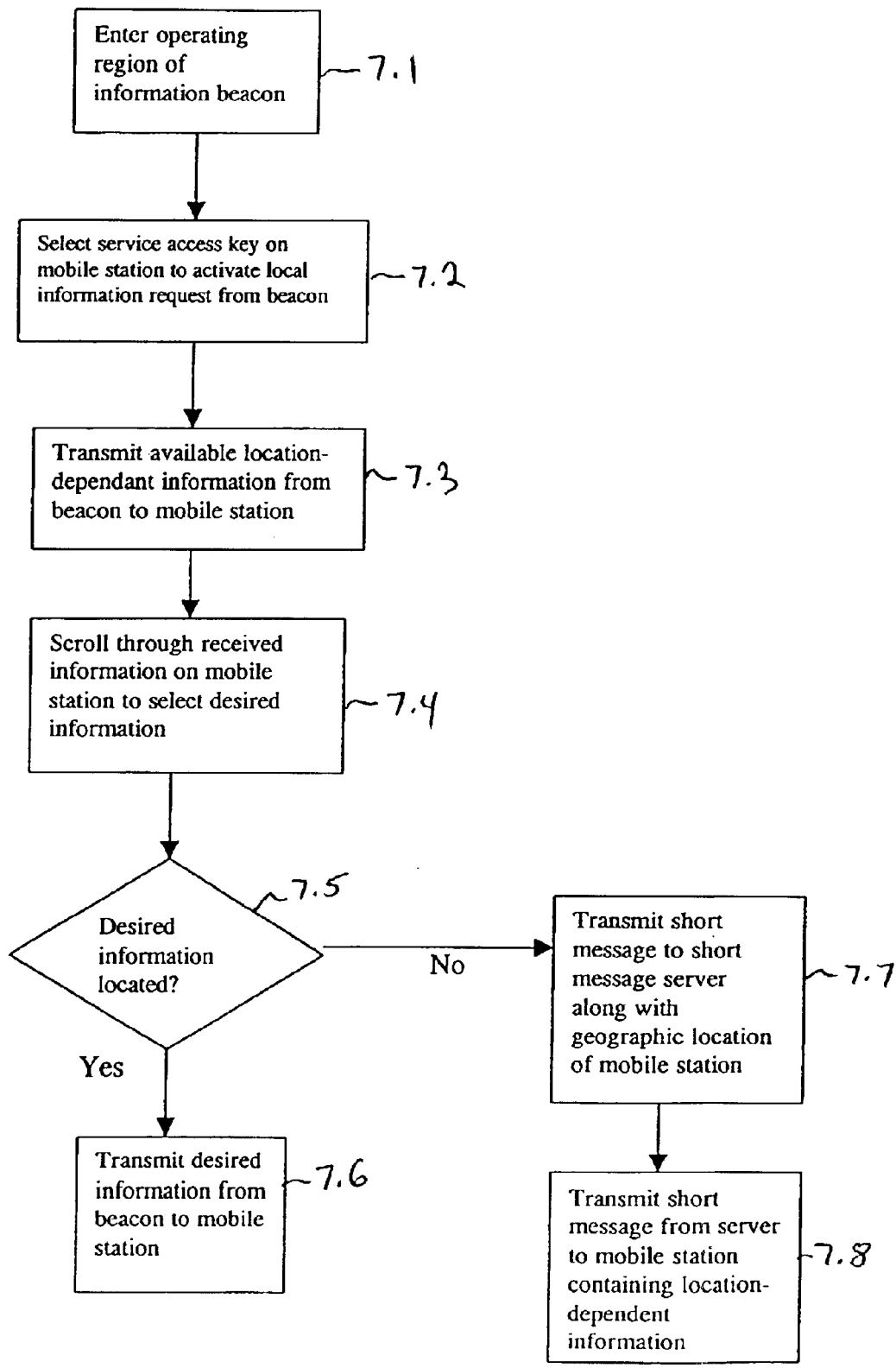
FIG. 7 is a flowchart illustrating a communication method in accordance with one embodiment of the present invention.

With reference now to FIG. 7, the inventive location based information method is performed according to one embodiment of the invention by positioning a mobile station within an operating broadcast region of an information beacon (step 7.1). This may be accomplished, for example, when a mobile station user enters a location serviced by the information beacon, e.g., an airport, train station, shopping mall, etc. Once within the beacon operating range, the mobile station service access key 420 is selected whereupon a local wireless information request is transmitted by the MS short range transceiver 404 to the beacon 14 (step 7.2). In response to the request, the receiving information beacon will transmit location based information relevant to the general geographic position of the mobile station via a local wireless transmission (e.g., Bluetooth) (step 7.3). The transmitted information may be information categories (e.g. departure schedule information, arrival schedule information, track information, etc.) whereupon the receiving MS will be used to scroll through and select the desired information category, for example, by using function keys on the keypad 418 of the MS (step 7.4). The desired information category will be selected and the information pertaining to the selected category will be transmitted from the beacon to the MS (step 7.6). Alternatively, all available information may be downloaded and the recipient can then use a terminal device keypad to browse through the information and review the desired information categories. If the desired information category is not located, an SMS or other transmitted request along with an indication of the general geographic location of the MS can be transmitted from the MS to a service provider server, e.g., an SMS server (step 7.7). In response, the SMS server will transmit, either directly or through a service provider server in communication with the SMS server, one or more short messages containing location service information relevant to the MS location (step 7.8). In this manner, a user who is urgently seeking location information services (such as train schedule information), can simply select the services access key 420 as the user enters the train station for receiving location based information.

Figure 8:
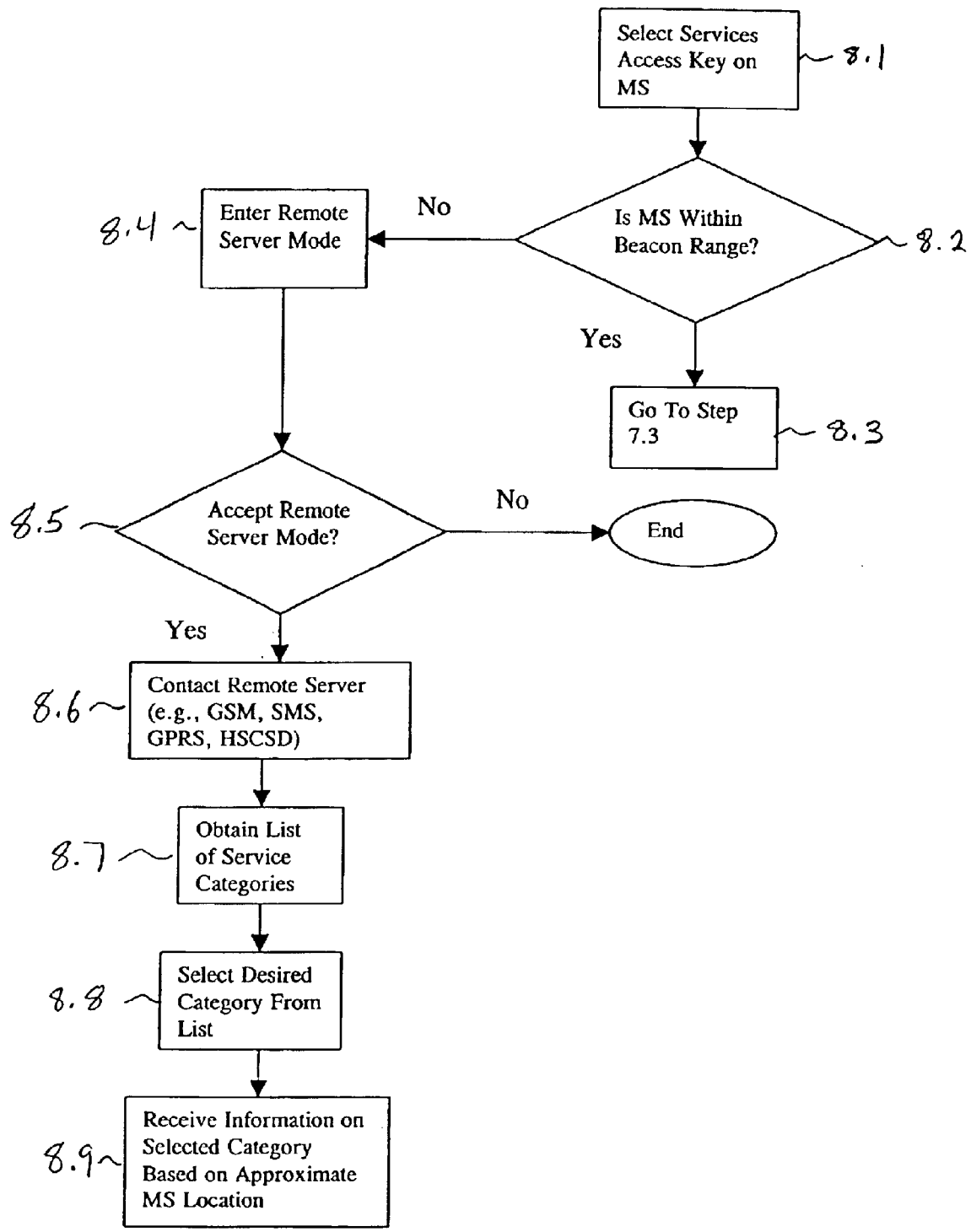
FIG. 8 is a flowchart illustrating a communication method in accordance with one embodiment of the invention.

Another possibility is using WAP communication techniques to communicate with the remote server 500. This process is illustrated in FIG. 8 according to one embodiment of the invention. After a services access key is selected on the mobile station (step 8.1), a determination is made as to whether the mobile station is within a communication range of a beacon and/or whether such communication is possible, i.e. within Bluetooth communication range (step 8.2). If the answer to the query is "yes", the process goes to step 7.3 in FIG. 7 to commence Bluetooth communication (step 8.3).

In the event Bluetooth communication is not possible, such that the answer to the query in step 8.2 is "no", the mobile station will enter a remote server mode (step 8.4) to attempt to connect to a mobile station network, e.g., GSM, SMS, etc. The user will then be prompted on the mobile station to accept of reject the remote server mode (step 8.5). If rejected, the process simply ends without obtaining location information. If accepted, a remote server will be contacted using any variety of techniques such as GSM, SMS, GPRS or HSCSD (step 8.6). Thereafter, a list of available service categories (e.g., shoe stores, grocery stores, restaurants, etc.) is downloaded to the mobile station (step 8.7) whereupon the user will select the desired category from the list (step 8.8) such as via use of a scroll key or other selection function. After the category is selected, information pertaining to the selected category will be provided to the mobile station based on the then-current location of the mobile station (step 8.9).

It should be appreciated that although only certain categories of information have been discussed above, these categories are exemplary. The invention can, likewise, provide location-dependent information such as, but not limited to, advertisements for local stores/services, providing maps, etc. It should also be appreciated that the invention can result in revenue generation to a services and/or content provider by assessing a mobile station user with a subscriber or content based fee corresponding, for example, to the services requested and/or the content or data transmitted to a particular mobile station.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method of providing location-dependent services information to a mobile station having a memory, the mobile station being capable of short range communication and being capable of communicating with a base transceiver station, comprising the steps of:

activating a dedicated services access key on the mobile station for initiating a search for location-dependent services;

transmitting a short range wireless communication query to the beacon for requesting location-dependent services information pertaining to a location of the mobile station, said short range wireless communication query including a predetermined information request for location-dependent services information associated with said key activation and (i) if it is determined that the mobile station is within the operating range of the beacon, transmitting, from the beacon to the mobile station in response to the mobile station short range wireless communication query, the requested location-dependent services information;

(ii) if it is determined that the mobile station is not within the operating range of the beacon, broadcasting location information to the mobile station over the base transceiver station broadcast channel, storing the location information in the mobile station memory, sending a request along with the stored memory location from the mobile station to a remote service provider for location-dependent services information concerning services pertaining to the location information, and transmitting, from the service provider to the mobile station, location-dependent services information.

2. The method of claim 1, wherein said location-dependent services information comprises categories of services information.

3. The method of claim 2, further comprising the step of selecting, by using function keys on the mobile station, desired information from the categories of information.

4. The method of claim 1, wherein the mobile station comprises a Bluetooth transceiver.

5. The method of claim 4, wherein the beacon comprises a Bluetooth transceiver.

6. The method of claim 1, wherein said transmitted location-dependent services information comprises a text message displayed on a display of the mobile station.

7. The method of claim 1, wherein the mobile station comprises a mobile phone.

8. The method of claim 1, wherein the step of sending a request to a remote service provider comprises using one of SMS and WAP.

9. The method of claim 1, wherein the location information is provided via a GPS system.

10. The method of claim 1, wherein the step of broadcasting comprises broadcasting plain language location information identifying the geographic location of the base station.

11. The method of claim 10, wherein said step of transmitting from the SMS provider comprises responding to the short message.

12. A system for providing location-dependent services information to a mobile station having a memory, the mobile station being capable of short range communication and being capable of communicating with a base transceiver station, comprising:

a mobile station including at least a short range transceiver and a dedicated service access key for initiating a search for location-dependent services, said mobile station capable of being located within an operating range of a short range transceiver of a short range communication beacon;

said dedicated service access key of the mobile station being activatable for initiating a search for location-dependent services information pertaining to a location of the mobile station;

means for determining, in response to activation of said dedicated service access key, whether said mobile station is within the operating range of the short range transceiver for effecting wireless communication between said mobile station and said beacon;

said short range transceiver of the mobile station being capable of sending a request for location-dependent services information and receiving a reply from the short range transceiver of the short range communication beacon in response to activation of said dedicated service access key if said mobile station is within the operating range of the short range transceiver;

means for broadcasting to the mobile station over the base transceiver station broadcast channel, location information;

means for storing the location information in the mobile station memory;

means for sending a request along with the stored memory location information from the mobile station to a remote service provider for location-dependent services information concerning services pertaining to the location information; and means for transmitting, from the service provider to the mobile station, location-dependent services information.

13. The system of claim 12, wherein said transmitted location-dependent services information comprises categories of services information.

14. The system of claim 13, further comprising means for selecting, by using function keys on the mobile station, desired information from the categories of information.

15. The system of claim 12, wherein the mobile station comprises a Bluetooth transceiver.

16. The system of claim 15, wherein the beacon comprises a Bluetooth transceiver.

17. The system of claim 12, wherein said transmitted location-dependent services information comprises a text message displayed on a display of the mobile station.

18. The system of claim 12, wherein the mobile station comprises a mobile phone.

19. The system of claim 12, wherein said means for sending a request from the mobile station to the remote service provider comprises using one of SMS and WAP.

20. The system of claim 19, wherein the location information is provided via a GPS system.

21. The system of claim 12, wherein said broadcasting means comprises means for broadcasting plain language location information identifying the geographic location of the base station.

22. A mobile station comprising:

an access key for requesting location based services;

a processor;

a memory unit;

a short range transceiver enabling short range communication;

a network transceiver enabling communication in a mobile network;

an output device for outputting received content;

software means operative on the processor for;

maintaining in the memory unit a database including a communication response value and a threshold value and at least one predetermined message requesting for location-dependent services usable for short range communication and at least one another predetermined message requesting for location-dependent services usable for different type of communication;

starting short range communication in response to selecting the service access key using the predetermined message requesting for location-dependent services usable for short range communication;
periodically scanning the value of the communication response; and
if the communication response value exceeds the threshold value, starting communication using the predetermined message requesting for location-dependent services usable for different type of communication.

23. The mobile station of claim 22, wherein the short range transceiver enabling short range communication comprises a Bluetooth transceiver.

24. The mobile station of claim 22, wherein the communication response value exceeds the threshold value if the response for location-based services in short range communication is not received.

25. The mobile station of claim 22, wherein current location information is inserted along with the predetermined message requesting for location-dependent services usable for different type of communication.

26. The mobile station of claim 25, wherein the current location information is provided via a GPS system.

27. A method of providing location-dependent services information to a mobile station being capable of short range communication, said mobile station having a memory and being capable of communicating with a base transceiver station, comprising the steps of:
determining whether the mobile station is within an operating range of a short range communication beacon for effecting wireless communication between the mobile station and the beacon;
establishing a communication link between the mobile station and the beacon if it is determined that the mobile station is within the operating range of the beacon;
activating a services access key on the mobile station for transmitting a short range wireless communication query to the beacon for requesting location-dependent services information pertaining to a location of the mobile station;
transmitting, from the beacon to the mobile station in response to the mobile station query, location-dependent services information;
broadcasting location information to the mobile station over the base transceiver station broadcast channel;
storing the location information in the mobile station memory;
sending a request along with the stored memory location from the mobile station to a remote service provider for location-dependent services information concerning services pertaining to the location information if it is determined that the mobile station is not within the operating range of the beacon; and
transmitting, from the service provider to the mobile station, location-dependent services information.

28. The method of claim 27, wherein the step of sending a request to a remote service provider comprises using one of SMS and WAP.

29. The method of claim 27 wherein the location information is provided via a GPS system.

30. The method of claim 27, wherein the step of broadcasting comprises broadcasting plain language location information identifying the geographic location of the base station.

31. The method of claim 30, wherein said step of transmitting from the SMS provider comprises responding to the short message.

32. A system for providing location-dependent services information to a mobile station, the mobile station being capable of short range communication, comprising:
a mobile station including at least a short range transceiver a service access key and a memory card, said mobile station located within an operating range of a short range transceiver of a short range communication beacon and being capable of communicating with a base transceiver station
said service access key of the mobile station being selectable for requesting location-dependent services information pertaining to a location of the mobile station, and;
said short range transceiver of the mobile station being capable of sending a request for location-dependent services information and receiving a reply from the short range transceiver of the short range communication beacon in response to the request for location-dependent services;
means for broadcasting to the mobile station over the base transceiver station broadcast channel, location information;
means for storing the location information in the mobile station memory;
means for sending a request along with the stored memory location information from the mobile station to a remote service provider for location-dependent services information concerning services pertaining to the location information; and
means for transmitting, from the service provider to the mobile station, location-dependent services information.

33. The system of claim 32, wherein said means for sending a request from the mobile station to the remote service provider comprises using one of SMS and WAP.

34. The system of claim 33, wherein the location information is provided via a GPS system.

35. The system of claim 32, wherein said broadcasting means comprises means for broadcasting plain language location information identifying the geographic location of the base station.

* * * * *